C. T. McCONNELL & E. B. HARRIS.
FARM GATE.
APPLICATION FILED OCT. 26, 1910.
1,033,336.
Patented July 23, 1912.
2 SHEETS—SHEET 2.
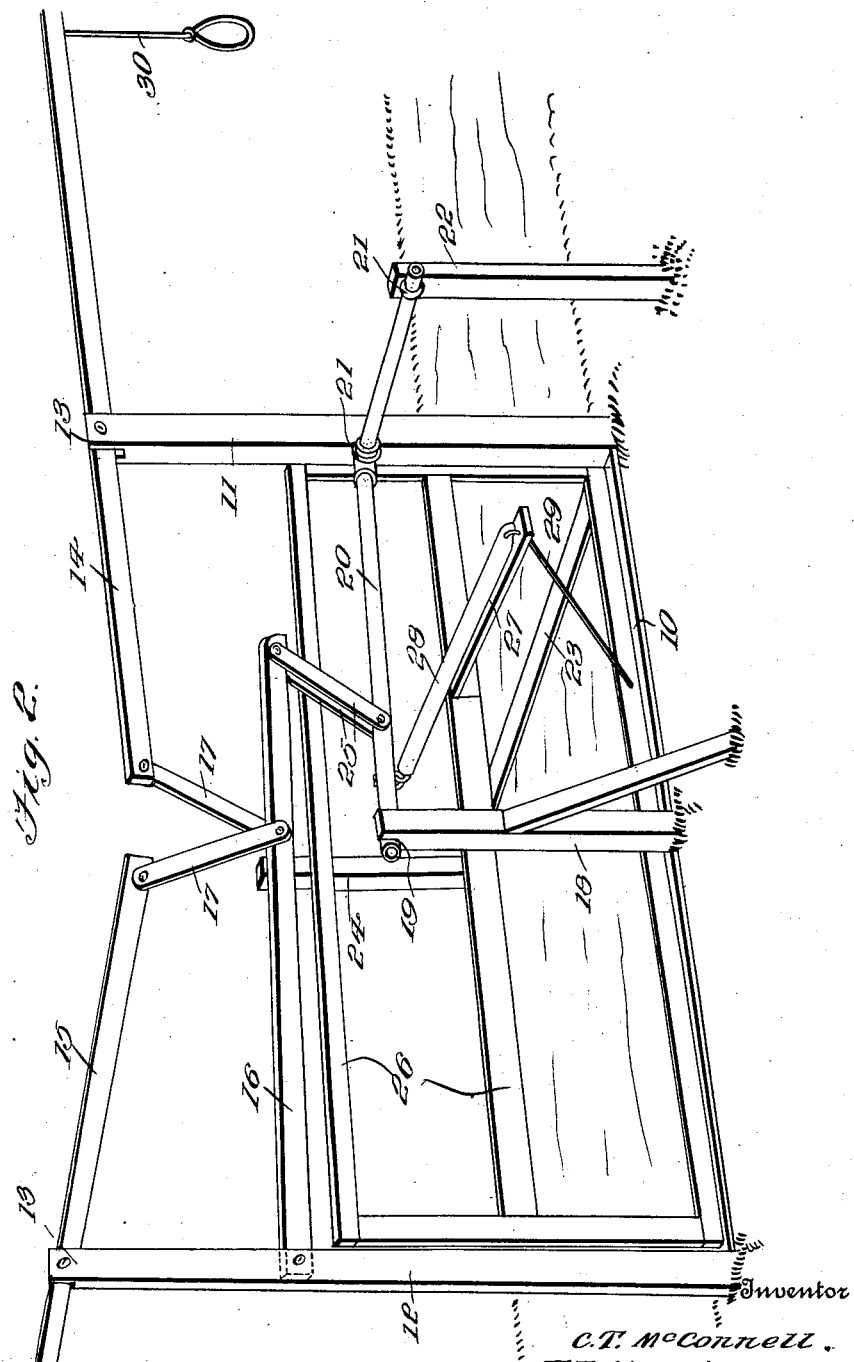

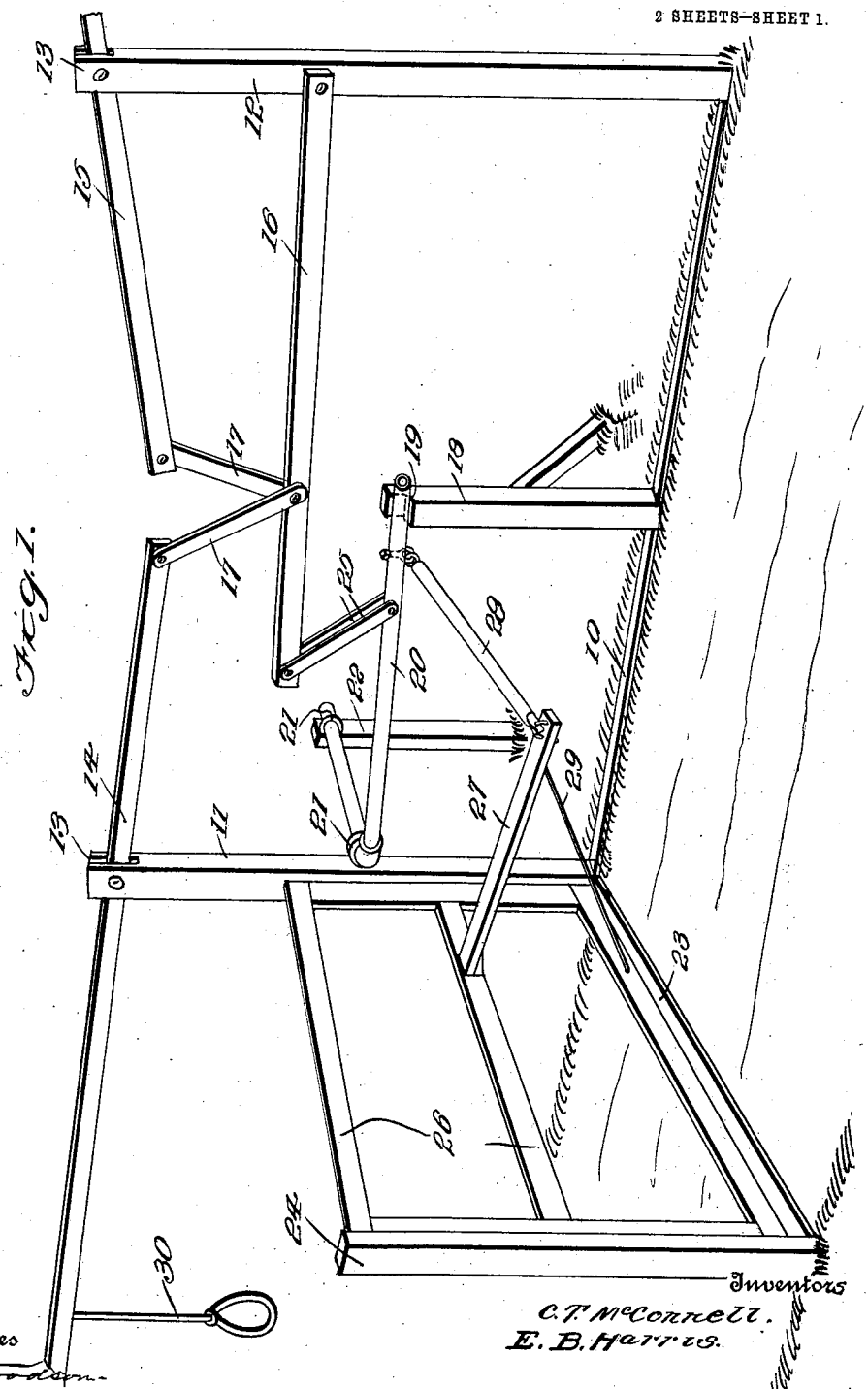

UNITED STATES PATENT OFFICE.

CHARLES T. McCONNELL AND EDGAR B. HARRIS, OF HOUSTONIA, MISSOURI.

FARM-GATE.

1,033,336. Specification of Letters Patent. Patented July 23, 1912.

Application filed October 26, 1910. Serial No. 589,182.

*To all whom it may concern:*

Be it known that we, CHARLES T. MCCONNELL and EDGAR B. HARRIS, citizens of the United States, residing at Houstonia, in the county of Pettis and State of Missouri, have invented certain new and useful Improvements in Farm-Gates, of which the following is a specification.

This invention relates to gates, having particular reference to an improved farm gate adapted to be opened and closed at the sides of the gate while approaching the same.

The invention has for an object to provide an improved gate operating mechanism which in itself latches the gate when closed or opened and holds the gate in such position until released by the further operation of the opening and closing mechanism.

The invention further contemplates a gate operating mechanism which is provided with operating levers and at its opposite sides connected to a single mechanism arranged adjacent to the gate which is operable for closing and opening the gate by the downward movement of the outer ends of the levers.

For a full understanding of the invention reference is to be had to the following description and accompanying drawings, in which:

Figure 1 is a perspective view of one side of the gate, showing the same closed. Fig. 2 is a perspective view of the opposite side of the gate showing the gate open.

Corresponding and like parts are referred to in the following description and indicated in all the views of the accompanying drawings by the same reference characters.

Referring to the drawings the numeral 10 designates a ground beam which is arranged substantially in parallel relation with the roadway. The opposite ends of the beam 10 are provided with standards 11 and 12 terminating at a considerable height above the beam 10 and having forked upper extremities, as is disclosed at 13. A pair of operating levers 14 and 15 are hinged midway of their ends in the forked extremities 13, the inner ends of the operating levers 14 and 15 being slightly spaced from one another over the central portion of the ground beam 10. The standard 12 is provided with a swinging arm 16 projecting toward the standards 11 and having connection to the inner ends of the operating levers 14 and 15 by connecting links 17. The ground beam 10 is provided with a latch-post 18 extending upwardly between the standards 11 and 12 but a short distance and having a shoulder 19 formed in one side thereof and upon its upper end for the reception of the outer end of the latch-lever 20. The latch-lever 20 is of L-form, having its short arm journaled through bearings 21 carried by the standard 11 and by a stub post 22 spaced a short distance from the standard 11. The frame of the gate is further provided with a second ground beam 23 extending from the standard 11 at right angles to the ground beam 10 and in alinement with the stub-post 22. The beam 23 is of a length corresponding to the width of the gate employed and is provided on its outer end with a gate-post 24 registering with the outer end of the gate when closed. The latch-lever 20 is hingedly connected to the outer end of the swinging arm 16 by links 25 so as to raise the latch-lever 20 from the shoulder 19 upon the upward movement of the arm 16.

A suitable gate 26 is hinged upon the standard 11 to swing between the same and the gate-post 24. The gate 26 is of any substantial form and is provided adjacent to its inner end with a laterally extending rigid-arm 27 connected by a universally mounted link 28 to the latch-lever 20. A brace 29 is disposed between the lower end of the gate 26 and the outer extremity of the rigid arm 27 so as to hold the latter firmly in position. The upper end of the link 28 is connected to the latch-lever 20 at a point adjacent to the pivoted ends of the links 25.

The operating levers 14 and 15 project outwardly from the standards 11 and 12 to a considerable distance and are provided with depending hand-grasps 30 in the form of a cable or the like, to permit the operator to draw the operating levers 14 and 15 down whether on foot or in a vehicle.

The operation of the improved gate is as follows: When the operator approaches the gate and desires to pass through the same he draws down the adjacent hand-grasp 30 to swing the inner end of the lever 15 up. As the lever 15 moves up, the connecting link 17 is carried therewith and raises the swinging arm 16. The latch-lever 20 is removed from the shoulder 19 by the links 25 and at the same time draws the link 28 in toward the frame of the gate. As the link 28 is connected at its opposite ends by universal joints to the latch-lever 20 and the rigid-arm 27 respectively, it draws the gate 26 against the frame. When the link 28 is in a vertical plane, the gate being half open, further movement to open the gate carries the outer end of the rigid-arm 27 through the frame and draws the link 28 down to approach a horizontal position. This movement returns the latch-lever 20 to the shoulder 19 and the same is held in such position by its own weight and by the weight of the swinging arm 16 to yieldingly hold the gate closed. It is contemplated, however, to arrange the rigid-arm 27 in substantially a horizontal plane so as to position its outer end in the same plane with the upper end of the link 28 so that when force is applied to the gate to close the same it will be directed against the latch-lever 20 at right angles to its path of movement and will bind the gate open.

It is readily seen that when it is desired to close the gate all that is necessary is to draw down the opposite hand-grasp 30, after the operator has passed through the gate, when the operating lever 14 will raise the swinging arm 16 and the latch-lever 20 to draw the link 28 through the frame and swing the gate into a closed position. The gate is locked in a closed position by the latch-lever 20 when it rests upon the shoulder 19 as the link 28 directs the force upon the lever 20 at right angles to its path of movement. It is also observed that the operating levers 14 and 15 are in a position to be drawn down to operate the gate when the gate is either open or closed so that the same action is effected in both positions of the gate.

Having thus described the invention what is claimed as new is:—

In combination with a gate hingedly mounted upon a post for horizontal swinging movement and having an arm rigidly attached to its side, an operating device comprising a post located behind the hinge post and a post having at its upper end a notch and located at the side of the hinge post, both of the last mentioned posts being spaced from the hinge post, a latch lever having angularly disposed end portions, one portion being pivoted to the hinge post and the post behind the hinge post, and the other portion adapted to normally rest in the notch of the post at the side of the hinge post, a link pivotally connected at one end with the arm and at its other end pivotally connected with the lever at a point between the hinge post and the notch post, and a lever mechanism operable from either side of the gate and operatively connected with the first mentioned lever at a point between the hinge post and the point of pivotal connection between the said lever and the link.

In testimony whereof we affix our signatures in the presence of two witnesses.

CHARLES T. McCONNELL.
EDGAR B. HARRIS.

Witnesses:
H. M. ROMSEYER,
E. O. GAY.

---

Copies of this patent may be obtained for five cents each, by addressing the "Commissioner of Patents, Washington, D. C."